Patented Nov. 9, 1943

2,333,662

UNITED STATES PATENT OFFICE 2,333,662

MANUFACTURE OF TITANIUM DIOXIDE PIGMENTS

Andrew T. McCord and Harold F. Saunders, Haddonfield, N. J., assignors to The Sherwin-Williams Company, Cleveland, Ohio, a corporation of Ohio No Drawing. Application May 2, 1942,
Serial No. 441,532

7 Claims. (Cl. 106—300)

This invention relates to the preparation of titanium pigments, and particularly to the preparation of nuclear solutions and seed crystals and their use in the precipitation of titanium compounds by hydrolysis at elevated temperatures of sulphuric acid solutions containing titanium.

This application is a continuation-in-part of our prior and copending applications Serial Number 356,646, filed Sept. 13, 1940 and Serial Number 377,046, filed Feb. 1, 1941.

Titanium dioxide pigments are most commonly precipitated from titanium sulphate solutions which have been prepared from the reaction product of a titanium-bearing material such as ilmenite ore and sulphuric acid. The preparation of such solutions is well known in the art and has been described by Blumenfeld in U. S. Patent No. 1,504,669 and by others.

The solution obtained by leaching the digestion mass with water is first treated with sufficient metallic iron to reduce all of the iron present to the ferrous state and then chilled to crystallize out the major portion of the iron present as the sulphate. The solution at this stage may contain around 9% to 13% of $TiO_2$, and is then customarily submitted to a vacuum concentration process to bring the $TiO_2$ content up to 15% to 16%.

This solution may then be hydrolyzed by boiling, but it is customary to assure the presence of a nuclear material in the solution, prior to any actual precipitation of the $TiO_2$ by boiling, for the purpose of accelerating the rate of hydrolysis, increasing the yield and controlling the physical characteristics of the precipitated particles. This nuclear material may be formed in situ in the solution by dilution under rigidly controlled conditions, or added as a separately prepared seeding material.

In the prior art, titanium dioxide produced from the precipitate resulting from the hydrolysis at elevated temperatures of a crystalloidal solution of titanium in sulphuric acid in the presence of an adequate amount of colloidal $TiO_2$ compound, as seeding material, after suitably washing, treating, and calcining, has been the anatase modification.

In our copending application, Serial No. 356,646, to which this application is related, we have shown that when a specific type of titanium compound which we have termed γ-titanic acid is added to the sulphuric acid solution of titanium as a nucleating agent, the precipitate obtained by thermal hydrolysis may be calcined to the rutile modification at temperatures between 800° C. to 1,000° C.

In said last mentioned application, γ-titanic acid is defined as a form of hydrous titanium oxide characterized as producing upon X-ray analysis a band diffraction pattern, the bands not corresponding in position to either the characteristic position of rutile or anatase lines.

The characteristic positions of the bands and lines are shown in the following table:

| Bands of γ-titanic acid | | Lines of anatase | Lines of rutile |
|---|---|---|---|
| Å. U. d/n | Intensity | Å. U. | Å. U. |
| 5.83 | 5 | 3.49 | 3.24 |
| 3.99 | 10 | 2.37 | 2.48 |
| 3.40 | 6 | 1.883 | 2.29 |
| 3.145 | 2.5 | 1.695 | 2.18 |
| 2.600 | 2.5 | 1.655 | 2.04 |
| 2.342 | 3.5 | 1.477 | 1.685 |
| 2.132 | 3.5 | 1.358 | 1.617 |
| 1.888 | 8.0 | 1.334 | 1.479 |
| 1.696 | 1.5 | 1.261 | 1.448 |
| 1.499 | 9.5 | 1.161 | 1.351 |
| 1.354 | 3.0 | 1.044 | 1.240 |
| 1.247 | 2.5 | 1.015 | 1.167 |
| 1.177 | 3.5 | .951 | 1.144 |
| 1.087 | 2.5 | .913 | 1.092 |
| 1.048 | 5.0 | .892 | |
| 1.011 | 1.5 | .876 | |
| 0.956 | 6.0 | .843 | |
| 0.917 | 0.5 | .824 | |
| 0.894 | 2.0 | .806 | |
| 0.868 | 4.0 | | |
| 0.843 | 0.5 | | |
| 0.813 | 3.0 | | |
| 0.785 | 2.0 | | |
| 0.747 | 3.0 | | |
| 0.712 | 3.5 | | |
| 0.693 | 1 | | |
| 0.682 | 2.5 | | |
| 0.670 | 3.5 | | |
| 0.656 | 1 | | |

It will then be understood that in this specification and in the claims of this application the term "γ-titanic" acid is used to denote a compound of titanium so defined.

Applications Serial Nos. 356,646 and 370,486 further describe several methods by which γ-titanic acid may be prepared.

We have found that when γ-titanic acid is added to an ilmenite solution as a nucleating agent prior to hydrolysis, the precipitate obtained by hydrolysis will be of the anatase crystal structure, but will differ from ordinary anatase hydrolysates from sulphate solutions in that after suitable separation and washing, it calcines to rutile at temperatures between 800° C. to 1,000° C., and in this last property only bears any relationship to γ-titanic acid. We have further found that when a sulphuric acid solution of titanium is nucleated with anatase derived from a γ-titanic-acid nucleated sulphuric acid solution of titanium such as an ilmenite solution, the products of hydolysis are identical with the nucleating agent.

We have further found that either γ-titanic acid or anatase derived by thermal hydrolysis of a γ-titanic acid nucleated solution of titanium sulphate such as an ilmenite sulphate solution, may be used as nucleating agents for solutions of titanium in sulphuric acid in the presence of extender pigments, and that the products of hydrolysis, upon suitable washing, treating and calcining, will be titanium extended pigments wherein the titanium dioxide component is present as the rutile crystalline form.

The "treating" above referred to may be with MgO, ZnO and their salts, and the amounts may be 0.1% to 0.5% as oxide based on $TiO_2$.

It was not known or disclosed in the prior art that such a compound could be used as a nucleating agent for ilmenite solution to produce a product readily convertible into rutile.

*Example 1.*—γ-titanic acid was prepared by dissolving titanium tetrachloride in twice its volume of water and slowly adding this mixture to four times its volume of 20% aqua ammonia. The precipitate was washed until the filtrate was substantially free from ammonia. The wet cake contained 30% $TiO_2$ in the form of γ-titanic acid as established by air drying a small sample at 60° C., and showed, upon X-ray examination, the diffraction pattern typical of γ-titanic acid. The wet cake was redispersed in an equal weight of sulphuric acid with low heat or no heat and an amount of this dispersion equivalent to one gram of $TiO_2$ was added to 1250 grams of ilmenite solution containing 8.1% $TiO_2$ and 19% $H_2SO_4$. This nucleated ilmenite solution was added to a slurry of anhydrite in water containing 235 grams $CaSO_4$, 180 grams $H_2SO_4$, and 820 grams of water. The mixture was boiled four hours to complete the thermal hydrolysis of the titanium. The solids were separated and washed until the filtrate was iron-free, dewatered and calcined two hours at 975° C. The product was a titanium extended pigment containing approximately 70% $CaSO_4$ and 30% $TiO_2$, and in which the titanium content was present substantially as rutile.

*Example 2.*—A quantity of γ-titanic acid moist cake prepared from titanium tetrachloride solution as in Example 1 was added to ilmenite solution containing 8.1% $TiO_2$ and 19% $H_2SO_4$ in the proportion of one gram $TiO_2$ as γ-titanic acid to every 100 grams of $TiO_2$ in the ilmenite solution. 1250 grams of this nucleated ilmenite solution were added to 1240 grams of a calcium sulphate slurry prepared by running 10% lime slurry into 93% $H_2SO_4$. The calcium sulphate slurry contained 235 grams of $CaSO_4$, and 185 grams $H_2SO_4$. The mixture was boiled three hours, separated, washed until the filtrate was free from iron, by which time the proportion of $CaSO_4:TiO_2$ was 70:30. The wet cake was mixed with 0.2% ZnO (added as zinc sulphate solution) and calcined two hours at 975° C. The product had a tinting strength of 635, excellent whiteness and texture, and the titanium content was present as rutile.

*Example 3.*—A quantity of dried fluoride process hydrate prepared by contacting ammonium fluotitanate solution with ammonia, separating and washing the precipitate, reslurrying in five times its weight of water, dewatering and air drying to 75% $TiO_2$, in the form of γ-titanic acid, was added to ilmenite solution in the proportion of one gram $TiO_2$ as γ-titanic acid to 100 grams $TiO_2$ in the ilmenite solution. 1250 grams of this nucleated ilmenite solution were then mixed with 1240 grams of a slurry containing 240 grams anhydrite and 180 grams of $H_2SO_4$. The mixture was boiled for three hours, dewatered, washed until the filtrate was iron-free, and dewatered. The recovery of titanium was 95%, and the ratio of $CaSO_4:TiO_2$ in the cake was 70:30. The cake was treated with 0.2% MgO (added as $MgSO_4$ based on weight of total solids in the cake) and calcined for two hours at 975° C. The product was of very soft texture, tinting strength=600, and high whiteness and brightness. The titanium content was shown by X-ray examination to be rutile.

*Example 4.*—250 grams of CaO slurry containing 25 grams CaO were poured into 110 grams of 96% sulphuric acid. To this were added 3000 grams of ilmenite solution containing 8.3% $TiO_2$ and 19% $H_2SO_4$, and to which had been added 1 gram of $TiO_2$ as γ-titanic acid prepared as in Example 3 for each 100 grams of $TiO_2$ in the ilmenite solution. The mixture was boiled for four hours and washed with water until the calcium sulphate was substantially all removed. The cake, after dewatering, was calcined at 975° C. for two hours. The product was soft textured, pigmentary rutile.

*Example 5.*—γ-titanic acid was prepared by contacting a solution of ammonium fluotitanate with excess ammonia. The precipitate was separated from the mother liquor in a filter and washed with five times its weight of water. The cake was reslurried and again washed in a similar manner and dewatered. The cake was air dried to 75% $TiO_2$. 100 grams of the cake was crushed and slowly added, with agitation to 350 grams of 30% sulphuric acid. A clear liquor resulted containing approximately 22% $TiO_2$. 5 grams of this liquor was added to each 1250 grams of an ilmenite solution which analyzed 8.1% $TiO_2$; 19.0% $H_2SO_4$. 1255 grams of this now nucleated ilmenite solution was then mixed with 1240 grams of a slurry containing 240 grams of anhydrite and 180 grams of $H_2SO_4$. The mixture was boiled for three hours, the precipitate dewatered, washed until the filtrate was iron-free, and dewatered. The recovery of titanium was 95% and the ratio of $CaSO_4:TiO_2$ in the cake was 70:30. The cake was treated with 0.2% MgO (added as $MgSO_4$ solution and based on the weight of total solids in the cake) and calcined for three hours at 975° C. The product was of excellent texture, tinting strength=600, and high whiteness and brightness. The titanium dioxide content was shown by X-ray examination to be rutile.

30% hydrochloric acid or twice the weight of 20% nitric acid instead of sulphuric acid may be used to redisperse the γ-titanic acid of the wet cake in Example 5 with equivalent results.

While we have used calcium sulphate in the anhydrite form as the extender in the examples given, other extenders such as barium sulphate may be used. Also, the extender may be introduced after the hydrolysis of the nucleated ilmenite solution, or into the wet hydrate prior to calcination with satisfactory results, and extenders somewhat susceptible to hot strong acid may be employed in this manner, as chalk, calcium carbonate, asbestine, micaceous extenders, etc.

Having thus described our invention, what we claim as new and desire to secure by Letters Patent is:

1. The process of making an extended pigment which includes nucleating an ilmenite solution with γ-titanic acid and hydrolyzing said solution by boiling in the presence of an extender.

2. The process of making a pigmentary rutile which includes nucleating an ilmenite solution with γ-titanic acid, hydrolyzing said solution by boiling in the presence of calcium sulphate, separating the precipitate, washing out the calcium sulphate, and calcining.

3. The process of making an extended pigment which includes nucleating an ilmenite solution with γ-titanic acid obtained from precipitation of ammonium fluotitanate with ammonia, hydrolyzing said solution by boiling in the presence of an extender, separating, washing and calcining the precipitate.

4. The process of making an extended pigment which includes nucleating a sulphuric acid solution of titanium with γ-titanic acid, adding a slurry of calcium sulphate containing sulphuric acid, and hydrolyzing said solution by boiling.

5. The process of making an extended pigment which includes nucleating a sulphuric acid solution of titanium with γ-titanic acid, adding a slurry of anhydrite containing sulphuric acid, and hydrolyzing said solution by boiling.

6. The process of making an extended pigment which includes nucleating a sulphuric acid solution of titanium with γ-titanic acid, hydrolyzing said solution by boiling in the presence of an extender, separating the precipitate, washing it free of iron to form a wet cake, mixing with said cake a small amount of a salt selected from the group consisting of sulphates of zinc and magnesium, and calcining at a temperature not in excess of 1,000° C.

7. The process of making an extended pigment, which includes nucleating a sulphuric acid solution of titanium with a small portion of a sulphuric acid dispersion of a separated, washed and air dried precipitate produced by the action of ammonia in an ammonium fluotitanate solution, and hydrolyzing said nucleated solution by boiling in the presence of an extender.

ANDREW T. McCORD.
HAROLD F. SAUNDERS.